April 18, 1950 J. A. WIPPERT 2,504,480
AMPLIFIER BIAS SYSTEM
Filed Jan. 21, 1946
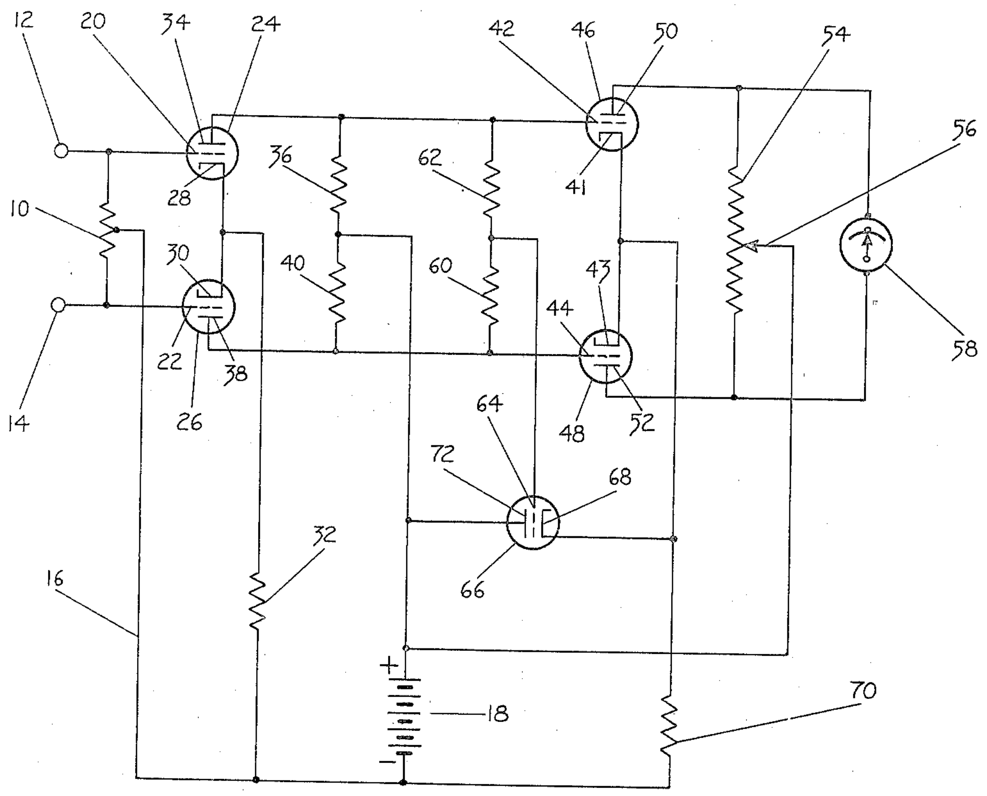
Inventor
JAMES A. WIPPERT
By George V. Eltgroth
Agent Patented Apr. 18, 1950

2,504,480

UNITED STATES PATENT OFFICE 2,504,480

AMPLIFIER BIAS SYSTEM

James A. Wippert, Los Angeles, Calif., assignor to Bendix Aviation Corporation, South Bend, Ind., a corporation of Delaware Application January 21, 1946, Serial No. 642,476

8 Claims. (Cl. 179—171)

This invention relates to electric signal amplifiers and more particularly to an arrangement in such an amplifier whereby one or more of the separate devices may be biased to a favorable point on its operating characteristic, independently of the current flowing therethrough and without the use of additional power supplies.

It is well known that, in the employment of vacuum tube amplifiers of the electron discharge type, it is desirable to maintain the control element at some predetermined bias voltage with respect to the adjacent cathode to secure freedom from distortion and the desired mode of operation. In amplifiers where only alternating voltage signals are to be accommodated, the use of a capacitance shunted resistor connected in the cathode circuit to introduce the desired bias potential on the control grid with respect to the cathode is well known. Such configurations have proven unsatisfactory, however, in amplifiers designed to respond to direct current signal potentials because of the loss of sensitivity arising from the degeneration action of voltage changes appearing across the cathode bias resistor. When response to such direct current potentials is required the use of a shunting capacitor is of no value, as the capacitor presents infinite impedance to direct current potentials applied thereacross. Accordingly, in direct current amplifiers the necessary operating bias has been introduced by the insertion of separate voltage sources or biasing batteries in the control grid circuit or by the employment of a voltage divider drawing a high bleeder current with the various stages of the cascaded amplifier connected to appropriate taps thereon. The use of separate voltage sources for bias is unsatisfactory both from a mechanical and maintenance viewpoint as the separate batteries require periodic replacement if the apparatus is to continue to function properly. The use of the separate voltage divider with large bleeder current is wasteful from an economic viewpoint and undesirable from an engineering standpoint because of the additional capacity than required in the power supply, and in addition, the "motor-boating" or low frequency oscillation often experienced in apparatus of this nature due to mutual coupling of the cascaded amplifiers caused by the flow of signal currents through the common bleeder resistance.

Accordingly, it is an object of this invention to provide new and novel means for applying operating bias to the elements of an amplifier device without the use of a separate energy source and in which interaction of the various cascade stages may be avoided.

It is a further object of the invention to provide a direct current responsive amplifier in which the cathode of the amplifying device is maintained positive by a substantially fixed amount with respect to the average direct current potential of the associated control grid independently of the absolute direct control potential of said control grid.

The above objects and advances of the invention may be substantially accomplished by applying the average control grid potential to the control grid of an associated cathode follower amplifier having its cathode connected through a resistance to the negative terminal of a source of anode energy and its anode directly connected to the positive potential of said source, the cathode of the signal amplifier being connected to the cathode of said cathode follower valve.

Other objects and advances of the invention will in part be described and in part be obvious when the following specification is read in conjunction with the drawing in which:

The single figure is a schematic diagram of a direct current amplifier embodying the principles of the invention.

Referring now to the drawing, there is shown an input impedance 10 connected at its extremities to the input terminals 12 and 14 and having a center tap connected through lead 16 to the negative terminal of the anode battery 18. The voltage appearing across the resistor 10 in the presence of input current at terminals 12 and 14 is applied symmetrically between the control grids 20 and 22 of the valves 24 and 26 provided with cathodes 28 and 30, connected together and to the negative terminal of the source 18, through a biasing resistor 32.

It is to be understood that the cathodes 28 and 30 are of the thermionic type and are provided with associated heaters maintaining them at operating temperature. Such heaters are also associated with the cathodes of the remaining amplifier valves in the figure but have been omitted from the showing together with the power supply therefor, in view of the fact that such arrangements are well known in the art.

Anode 34 of the valve 24 is connected with the positive terminal of source 18 through resistor 36 and anode 38 of the valve 26 is connected with said positive terminal of source 18 through the anode load resistor 40. The anode ends of resistors 36 and 40 are connected respectively with control grids 42 and 44 of valves 46 and 48, whose respective anodes 50 and 52 are connected to opposite ends of the resistor element 54 of a potentiometer having a movable tap 56. The indicating instrument 58 also is connected between the anodes 50 and 52. The movable tap 56 is connected to the positive terminal of source 18 to supply valves 46 and 48 with anode circuit energy.

There are also connected in series between control grids 42 and 44, resistors 60 and 62 of substantially equal value whose junction point is connected with the control grid 64 of the cathode follower valve 66 having its cathode 68 connected through cathode load resistor 70, to the negative terminal of source 18. The cathodes 41 and 43 of valves 46 and 48 are connected together and joined electrically with said cathode 68. The cathode follower stage is supplied anode excitation energy by the connection of anode 72 to the positive terminal of source 18.

*Theory*

Cathode follower circuits, as the name implies, are particularly characterized by the fact that the cathode potential tends to follow changes in grid potential, maintaining a potential differential therebetween such as to satisfy equilibrium conditions in the circuit. Current flow through an amplifier is given by the expression:

$$I_p=K\left[E_g+\frac{E_p}{\mu}\right]^{3/2} \qquad (1)$$

In the cathode coupled amplifier:

$$E_p=E_b-E_g \qquad (2)$$

Substituting:

$$I_p=K\left[E_g+\frac{E_b-E_g}{\mu}\right]^{3/2} \qquad (3)$$

Multiplying both sides by the cathode resistance:

$$R_kI_p=E_g=K\left[E_g+\frac{E_b-E_g}{\mu}\right]^{3/2}R_k \qquad (4)$$

$E_g$ is here equal to the drop which would occur across a resistor situated as resistor 70. Reforming the equation:

$$\frac{E_g}{\left[E_g+\frac{E_b-E_g}{\mu}\right]^{3/2}}=KR_k \qquad (5)$$

Now in circuit shown $KR_k$ is very large, so that:

$$\left[E_g+\frac{E_b-E_g}{\mu}\right]^{3/2}=0 \qquad (6)$$

and from this relationship it is found that:

$$E_g=\frac{1}{1+\mu}E_b \qquad (7)$$

indicating that the voltage across resistor 70 is a substantially constant fraction of the anode supply voltage so long as $KR_k$ is very large.

As applied to the present system, the quantities in the foregoing equations may be as follows:

$I_p$ is the plate or anode current of the tube 66;
K is a constant determined by the geometry of the tube 66;
$E_g$ is the potential difference between the cathode and grid of the tube 66;
$\mu$ is the amplification factor of the tube 66;
$E_b$ is the potential of the source 18; and
$R_k$ is the resistance of the resistor 70.

In operation, the input signal voltage symmetrically impressed on the control grids 20 and 22 produces amplified symmetric voltage variations across resistors 36 and 40 which are then directly applied to control grids 42 and 44 of the amplifying valves 46 and 48. The voltages so impressed give rise to symmetrical changes in the anode current flowing to each of these two valves to produce a signal voltage across the ends of potentiometer element 54, driving the meter 58 to a point on its scale indicative of the magnitude of the input current. In preparing the apparatus for use, the movable tap 56 on potentiometer 54 is conventionally adjusted for zero deflection of the meter 58 in the absence of input energy.

Because of the symmetrical nature of current changes in the valves 24 and 26, the center point of the grid-circuit-bridging resistors 60, 62, assumes a potential equal to the average of the voltages at the anodes 34 and 38 of the signal input amplifiers. Current flow through the biasing valve 66 tends to increase to the point where the voltage drop across resistor 70 is sufficient to maintain grid 64 negative with respect to cathode 68 by such an amount that the cathode-anode drop between 68 and 72 taken together with the voltage across resistor 70 is equal to the voltage delivered by anode energy source 18.

Should the voltage of anodes 34 and 38 suffer a variation downwardly due, for example, to change of cathode operating temperature, deterioration of the cathode emissive surface, or change in anode supply voltage or the like, grid 64 will become more negative with respect to cathode 68, diminishing the current flow through the valve 66 and thereby the voltage drop across resistor 70 until substantially the initially present difference of potential is re-established between cathodes 41 and 43 and the junction point of resistors 60, 62, whereby a substantially constant operating bias for the signal amplifying valves 46 and 48 is obtained.

In the particular circuit shown, the current in resistor 70 is the sum of the space currents of the valves 66, 46, and 48, but the bias remains substantially constant independent of excursions in the average direct current potential of the control grids 42 and 44 because the cathode-following action of valve 66 causes the cathodes 41 and 43 to substantially follow all the changes in average grid potential with such a separation as introduces the desired operating bias. However, the smaller is the total space current of valves 46 and 48 relative to the space current of valve 66, the better is the control of the biasing potential. In some instances it may be desirable to provide a source of anode potential for the valves 46 and 48 that is separate and distinct from the source 18 so that the return circuit from the anode source for valves 46 and 48 can be completed directly to the cathodes 41 and 43 of those valves without going through the resistor 70.

It is clear that, although this method of introducing the bias required for the operation of an amplifier stage is of particular value in so called direct current amplifiers, it may be applied with equal advantage to amplifiers intended for use with alternating signals, such as would be the case where coupling capacitors were introduced in the leads connecting anodes 34 and 38 to the grid ends of resistors 62 and 60.

In such a circuit, the necessity for a cathode by-pass capacitor is obviated because of the very low shunting impedance presented by the cathode follower viewed from the cathode.

In the push-pull arrangement of the input-amplifier circuit shown, resistor 32 does not introduce objectionable degeneration because of the symmetric nature of the current variations in the valves 24 and 26 whose total cathode current traverses said resistance 32.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced thereby.

What is claimed, and desired to be secured by United States Letters Patent is:

1. In an amplifier, a source of electric energy, having positive and negative terminals, an electric discharge device having at least a cathode, a control electrode, and an anode, a load impedance connected between said anode and said positive terminal, a resistor connecting said cathode and said negative terminal, an impedance network connecting said control electrode with said source of electric energy, a second electric discharge device having at least a cathode, a control electrode and an anode, means connecting said second control electrode with said first control electrode, means connecting said second cathode with said first cathode, and means presenting an impedance negligible with respect to the anode impedance of said second electric discharge device connected between said positive terminal and said second anode.

2. In an amplifier, a source of electric energy having positive and negative terminals, an electric discharge device having at least a cathode, a control electrode and an anode, a load device connected between said anode and said positive terminal, an impedance network connecting said control electrode with said source of electric energy, a second electric discharge device having at least a cathode, a control electrode and an anode, means connecting said second control electrode with said first control electrode, means connecting said second cathode with said first cathode, a resistor having an ohmic resistance at least of the order of magnitude of ten times the reciprocal of the mutual conductance of said second electric discharge device connecting said cathodes to said negative terminal, and means introducing a voltage drop negligible with respect to the output voltage of said source of electric energy connecting said second anode with said positive terminal.

3. In an amplifier responsive to direct voltage signals, a signal input valve having input and output circuits, means adapted to impress signals on said input circuit, a signal amplifying valve having input and output circuits, means galvanically connecting said amplifying valve input circuit with the output circuit of said signal input valve, a biasing valve having a control electrode, a cathode and an anode, means galvanically connecting said biasing valve control electrode with said input circuit of said amplifying valve, and means connecting said cathode of said amplifying valve and said cathode of said biasing valve through a common impedance to an anode power supply exciting the anode circuit of said biasing valve.

4. In an amplifier responsive to direct voltage signals: an amplifying tube having a cathode, anode and control electrode; a grid resistor having one end connected to said control electrode, and means for impressing direct voltage signals across said grid resistor; a source of anode potential, and means connecting its positive terminal to said anode; a biasing resistor, and means connecting it between said cathode and the negative terminal of said source; and a biasing tube having a cathode connected to the cathode of said amplifying tube, an anode connected to said positive terminal, and a control electrode connected to the other end of said grid resistor.

5. An amplifier according to claim 4 in which said biasing resistor has a resistance at least of the order of magnitude of ten times the reciprocal of the mutual conductance of said biasing tube.

6. An amplifier according to claim 4 in which the connection between said positive terminal and the anode of said biasing tube has negligible resistance.

7. In an amplifier responsive to direct voltage signals: a pair of push-pull amplifier tubes each having a cathode, a control electrode and an anode; a tapped grid resistor interconnecting said control electrodes, and a tapper load element interconnecting said anodes; means for impressing direct voltage signals across said grid resistor, a source of anode potential having its positive terminal connected to the tap on said load element; a biasing resistor and means connecting it in a common path between the negative terminal of said source and the cathode of both amplifier tubes; and a biasing tube having a cathode connected to the cathodes of said amplifier tubes, an anode connected to said positive terminal of said source, and a control electrode connected to the tap on said grid resistor.

8. An amplifier according to claim 7 in which said means for impressing direct voltage signals comprises another pair of push-pull amplifier tubes each having a cathode, a control electrode and an anode; a tapped load resistor interconnecting the anodes of said other tubes, and means connecting the tap to the positive terminal of said source of anode potential; means connecting the respective ends of the load resistor to the respective ends of said grid resistor and to the grids of said first mentioned pair of amplifier tubes, and means for applying a signal voltage between the control electrodes of said other pair of amplifier tubes.

JAMES A. WIPPERT.

REFERENCES CITED

The following references are of record in the file of this patent:

UNITED STATES PATENTS

| Number | Name | Date |
|---|---|---|
| 2,158,248 | Numans | May 16, 1939 |
| 2,232,212 | Cary | Feb. 18, 1941 |
| 2,273,511 | Bruck | Feb. 17, 1942 |
| 2,406,974 | Vance | Sept. 3, 1946 |

FOREIGN PATENTS

| Number | Country | Date |
|---|---|---|
| 540,834 | Great Britain | Oct. 31, 1941 |